Patented Mar. 23, 1926.

1,578,121

UNITED STATES PATENT OFFICE.

MATTHIAS M. HAW, OF BROOKLYN, NEW YORK.

PROCESS FOR MAKING RUBBER SUBSTANCE.

No Drawing. Application filed February 21, 1922. Serial No. 538,378.

*To all whom it may concern:*

Be it known that I, MATTHIAS M. HAW, a citizen of Germany, residing at Brooklyn, in the county of Kings and State of New York, have invented new and useful Improvements in Processes for Making Rubber Substance, of which the following is a specification.

This invention relates to a process for mixing rubber with pulverized stone so as to form a substantially homogeneous mass without setting up such a degree of friction as will burn the rubber.

The principal object is to produce a rubber substance which shall be resilient and at the same time durable and which shall possess a non-skidding property.

Another object is to produce a rubber substance which shall be highly efficient as a rubber substitute for use in shoe heels and soles, tires and other like purposes.

It has frequently been attempted to mix quantities of pulverized stone such as for example as quartz, basalt, granite, flint (hereinafter included in the term "hard stone") with rubber for producing a resilient and resisting substance. But the difficulty has been that in the ordinary mixing in order to obtain a homogeneous mass so much friction has been set up by the stone particles that it has invariably resulted in the burning of the rubber, thus entirely spoiling the mixture for any useful purpose.

In the present process, I first mix a quantity of stone material with a very small quantity of rubber,—say in the proportion of two parts of stone substance to one part of rubber. These are mixed slowly and for a long time. Eventually rubber substance will permeate the entire body of stone substance and will surround each of the fine particles, forming a coat of rubber thereover.

When this first mixture has become substantially homogeneous in character, the same is set aside and cooled. It is then mixed with the balance of the rubber, the amount of which depends upon the purpose for which the resultant mixture is to be used. After a thorough mixing this substance also becomes substantially homogeneous and then the well-known materials for further vulcanization are worked into the substance in the usual manner between heated rolls. When the substance is finished it contains from ten to fifty per cent of stone material according to the purpose for which it is intended.

By using this process, a stone substance may be readily mixed with the rubber so as to form a substantially homogeneous whole without any detriment from undue heating resulting from the friction of the stone constituent, and the resultant rubber substance may readily be vulcanized to other rubber or fabric parts.

All of the stone substance may be mixed with a little rubber and then the balance of the rubber added, the mass being cooled between additions; or part of the stone may be added at a time to all of the rubber with intervening periods of cooling. The essential feature is a plurality of periods of alternate mixing and cooling.

While I have described what I deem to be the most desirable embodiment of my invention, it is obvious that many of the details may be varied without in any way departing from the spirit of my invention, and I therefore do not limit myself to the exact details of process herein set forth nor to any thing less than the whole of my invention limited only by the appended claims.

What is claimed as new is:—

1. The herein described process of producing a rubber substance, which consists in first very slowly mixing a quantity of rubber with a quantity of pulverized hard stone and continuing such operation until each particle of the hard stone is fully covered with rubber, then cooling the mixture, then mixing the resultant mass with a further quantity of one of the said ingredients and then mixing the resultant mass with materials for furthering vulcanization.

2. The herein described process of producing a rubber substance, which consists in first very slowly mixing a quantity of rubber with a quantity of pulverized hard stone and continuing such operation until each particle of the hard stone is fully covered with rubber, then cooling the mixture, then mixing the resultant mass with a further quantity of rubber, and then mixing the resultant mass with materials for furthering vulcanization.

In testimony whereof I have affixed my signature.

MATTHIAS M. HAW.